2,778,835

SYNTHESIS OF 1-BENZAMIDO-1-PHENYL-3-PIPERIDINOPROPANE

Albert Pohland, Indianapolis, Ind., assignor to Eli Lilly and Company, Indianapolis, Ind., a corporation of Indiana No Drawing. Application March 18, 1955, Serial No. 495,364

3 Claims. (Cl. 260—294)

This invention relates to chemical processes and more particularly to an improved method for synthesis of 1-benzamido-1-phenyl-3-piperidinopropane.

1-benzamido-1-phenyl-3-piperidinopropane is a local anesthetic which is disclosed and claimed in my co-pending application, Serial No. 397,261, filed December 9, 1953. The method of preparing 1-benzamido-1-phenyl-3-piperidinopropane therein disclosed, while effective for production of this substance on a small scale, is not entirely suitable for commercial production.

The process provided by the present invention is operationally well adapted for a commercial synthesis. This process also is highly advantageous in that it provides 1-benzamido-1-phenyl-3-piperidinopropane of excellent purity in but a single step from readily obtainable starting materials.

My novel process comprises the reaction of 1-phenyl-3-piperidinopropanol and benzonitrile in the presence of concentrated sulfuric acid to form 1-benzamido-1-phenyl-3-piperidinopropane. It is necessary to use an excess of concentrated sulfuric acid in my process since this acid not only catalyzes the reaction but also is partially tied up as a salt with 1-phenyl-3-piperidinopropanol and with 1-benzamido-1-phenyl-3-piperidinopropane. A molar ratio of from about 2½ to 1 to about 3½ to 1 of concentrated sulfuric acid to 1-phenyl-3-piperidinopropanol is customarily employed, although ratios higher or lower than the stated range are fully operative. The reaction mixture is quite viscous and efficient stirring is necessary in order to avoid local overheating. An inert solvent such as glacial acetic acid can be used as a diluent, if desired, in order to increase the fluidity of the reaction medium and to moderate any localized overheating. The reaction is carried out with useful results within the temperature range from about 30° C. to about 100° C. A reaction temperature of above 100° C. while operative is less desirable since it causes excessive by-product formation. On the other hand, a reaction temperature lower than 30° C. undesirably retards the rate of reaction. A preferred reaction temperature is in the temperature range of about 50° C. to about 60° C. Since the reaction between 1-phenyl-3-piperidinopropanol and benzonitrile, as catalyzed by concentrated sulfuric acid is exothermic, it is necessary to provide external cooling means in order to maintain the reaction temperature in the preferred range.

The reaction is customarily carried out in the following manner: A mixture of equimolar quantities of 1-phenyl-3-piperidinopropanol and benzonitrile is well stirred in a reaction vessel while about three molar equivalents of concentrated sulfuric acid are added slowly to the reaction mixture at a rate which avoids overheating. Cooling means are provided to maintain the reaction temperature in the range of about 50° C. to about 60° C. during the addition of the acid. After this addition is complete, the reaction mixture is stirred for about one hour further at ambient temperature. The reaction mixture is then poured onto crushed ice and the 1-benzamido-1-phenyl-3-piperidinopropane is isolated as the free base by procedures familiar to the organic chemist, as by extraction with immiscible solvents following neutralization of the sulfuric acid present in the reaction mixture. 1-benzamido-1-phenyl-3-piperidinopropane thus isolated is then further purified either via formation of a crystalline salt such as a hydrochloride, or by direct crystallization of the free base. The free base can also be prepared in crystalline form by liberating it from an acid addition salt thereof, followed by a crystallization from an organic solvent. Suitable solvents for the purpose are methanol, ethanol, acetone, and ethyl acetate, alone or mixed with petroleum ether.

The process is further illustrated by the following specific examples:

EXAMPLE 1

*Preparation of 1-benzamido-1-phenyl-3-piperidinopropane and 1-benzamido-1-phenyl-3-piperidinopropane hydrochloride*

A reaction mixture containing 21.9 g. of 1-phenyl-3-piperidinopropanol and 10.3 g. of benzonitrile is prepared in a three-necked flask equipped with dropping funnel, thermometer, and stirrer. The flask is placed in an ice bath, and 18 ml. of concentrated sulfuric acid are added dropwise to the stirred reaction mixture, thus causing 1-phenyl-3-piperidinopropanol and benzonitrile to react to form 1-benzamido-1-phenyl-3-piperidinopropane which is present in the reaction mixture as a sulfate salt. The temperature of the reaction is maintained in the range of 50° C. to 60° C. by adjusting the rate of addition of sulfuric acid, and the height of the ice bath around the flask. After the addition of the sulfuric acid is complete, the reaction mixture is stirred for one hour without external cooling. The reaction mixture is then poured onto 200 ml. of ice. The resulting acid aqueous solution containing 1-benzamido-1-phenyl-3-piperidinopropane as a sulfate salt is washed with 200 ml. of ether to remove any unreacted benzonitrile or any nonbasic by-products. The aqueous layer is then made basic with sodium hydroxide solution. The free base of 1-benzamido-1-phenyl-3-piperidinopropane, being insoluble in this basic solution, separates and is extracted into ether. Two ether extractions using about 200 ml. each are carried out and the ether extracts are combined and dried. The hydrochloride of 1-benzamido-1-phenyl-3-piperidinopropane is precipitated by bubbling dry HCl gas into this ether solution. The hydrochloride of 1-benzamido-1-phenyl-3-piperidinopropane is separated by filtration and the resulting solid is crystallized from a mixture of methanol and ethyl acetate. 12.4 g. of crystalline 1-benzamido-1-phenyl-3-piperidinopropane hydrochloride melting at about 186–188° C. is thus obtained.

1-benzamido-1-phenyl-3-piperidinopropane is prepared as the free base by dissolving the hydrochloride salt in water, making the resulting acid aqueous solution basic with sodium hydroxide, extracting the insoluble free base into ether, removing the ether by evaporation in vacuo, and crystallizing the free base from a mixture of acetone and petroleum ether. 1-benzamido-1-phenyl-3-piperidinopropane thus prepared melts at about 111–112° C.

EXAMPLE 2

*Preparation of 1-benzamido-1-phenyl-3-piperidinopropane*

A mixture of 43.8 kg. of 1-phenyl-3-piperidinopropanol, 21.2 kg. of benzonitrile and 100 l. of glacial acetic acid is prepared in a suitable glass-lined tank provided with external cooling means such as a water jacket, and with efficient stirring means. 36 l. of concentrated sulfuric acid are added slowly to this reaction mixture under the same conditions as those of Example 1. The reaction mixture is stirred for one hour at ambient temperature after the addition of sulfuric acid is complete. The reaction mixture is then poured over ice. The resulting acid aqueous solution contains 1-benzamido-1-phenyl-3-piperidinopropane as a sulfate salt. This acid aqueous layer is extracted with ether and the ether extract discarded. The aqueous layer is then made basic with sodium hydroxide, and the 1-benzamido-1-phenyl-3-piperidinopropane which separates is extracted twice with three volumes of ether. The combined ether extracts are dried and the ether is evaporated in vacuo, leaving a residue comprising 1-benzamido-1-phenyl-3-piperidinopropane as the free base. Successive crops of crystalline 1-benzamido-1-phenyl-3-piperidinopropane are obtained by concentration and cooling a solution of this residue in a mixture of acetone and petroleum ether. These crystals melt in the range of 109–113° C. Their combined weight is 27.5 kg.

I claim:

1. The method of preparing 1-benzamido-1-phenyl-3-piperidinopropane which comprises reacting 1-phenyl-3-piperidinopropanol and benzonitrile in the presence of concentrated sulfuric acid at a temperature between about 30° C. and about 100° C., and isolating the 1-benzamido-1-phenyl-3-piperidinopropane which is formed in the reaction.

2. The process of claim 1 in which the reaction temperature is maintained in the range of about 50 to about 60° C.

3. The proces of claim 2 in which glacial acetic acid is used as a solvent.

No references cited.